(No Model.)

T. MILLS.
ICE CREAM DASHER.

No. 278,997. Patented June 5, 1883.

Witnesses.
Wm. H. Powell
Jos. B. Connolly

Thomas Mills
Inventor.
by Connolly Bros
Attorneys.

UNITED STATES PATENT OFFICE.

THOMAS MILLS, OF PHILADELPHIA, PENNSYLVANIA, ASSIGNOR TO THOS. MILLS & BRO., OF SAME PLACE.

ICE-CREAM DASHER.

SPECIFICATION forming part of Letters Patent No. 278,997, dated June 5, 1883.

Application filed December 22, 1882. (No model.)

*To all whom it may concern:*

Be it known that I, THOMAS MILLS, a citizen of the United States, residing at Philadelphia, in the county of Philadelphia and State of Pennsylvania, have invented certain new and useful Improvements in Ice-Cream Dashers; and I do hereby declare the following to be a full, clear, and exact description of the invention, reference being had to the accompanying drawings, which form part of this specification, in which—

Figure 1:
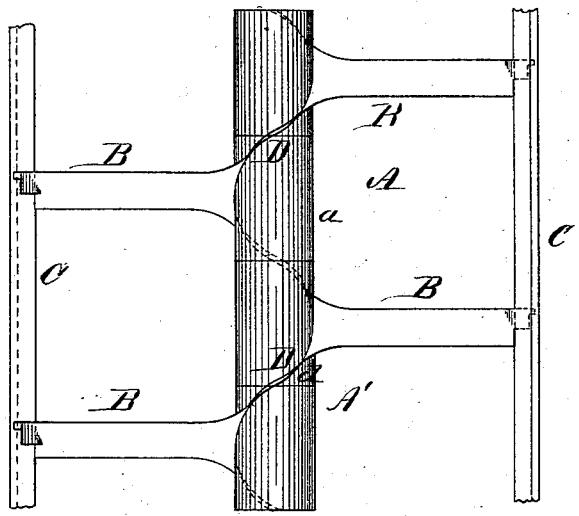
Figure 3:
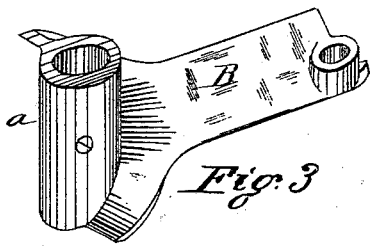
Figure 2:
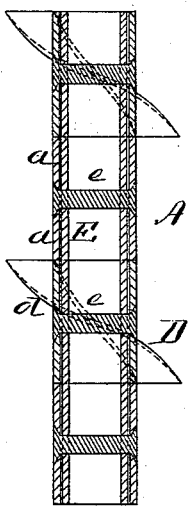

Figure 1 is an elevation, Fig. 2 a section, and Fig. 3 a detail perspective, of my invention.

My invention has for its object to provide an ice-cream dasher which, in operation, will cause the cream in the middle and at the bottom of the freezer to be lifted to the top and pass down the sides of the vessel, thus maintaining a constant circulation of cream while being frozen, and preventing stagnation of the fluid in the central and warmest part of the vessel.

My improvements consist, essentially, in forming an ice-cream dasher with a spiral incline around its spindle or shaft, and in certain details of construction, hereinafter fully set forth.

Referring to the accompanying drawings, A indicates an ice-cream dasher, comprising a central spindle or shaft, which is designed to stand vertically in a freezer and be rotated on its axis by suitable mechanism. Said shaft is formed or provided with inclined radial beaters B B, which, at their outward extremities, are attached to scrapers C C. The beaters B B spring or proceed from the shaft A', and at their union or junction therewith are spread so as to form a spiral incline, D; or, conversely, the shaft A' is formed with a spiral incline, D, from whose edge, at intervals, project the inclined beaters B B.

If desired, the shaft, incline, and entire series of beaters may consist of a single casting, and this construction can be adopted advisably with small dashers—such, for example, as are used ordinarily for family purposes, or in freezers of ten-gallon capacity or less; but for dashers of larger size—such, for example, as confectioners or manufacturers of ice-cream employ—I prefer to make the dasher in sections. Each such section consists of a tubular hub, $a$, with a portion, $b$, of the incline and one beater. These sections are fitted together on a pipe, E, (or equivalent solid rod,) and held from turning thereon by pins $e\ e$ or other suitable means of fastening. The sections thus fastened on the pipe are arranged so that the spiral incline is continuous from its top to its bottom.

By making the dasher in sections several advantages are obtained. The sections can be cast more readily than a whole dasher could.

Where malleable castings are made bending or distortion is apt to occur in the annealing, and breaking frequently results in the subsequent operation of straightening. Such bending and breaking are of less consequence in case of a section than they would be in a whole dasher. By making the dasher sectional the length can be increased indefinitely by adding sections, so that a single pattern will suffice for any desired length of dasher.

Should a beater at any time get broken, a new section can readily be substituted at slight expense for a fractured one, whereas if the dasher were made in one piece the loss of the entire dasher would be incurred, or its repair would be both difficult and costly.

The spiral may be either right or left handed, according as the freezer is, the design being that the dasher shall be so arranged that its rotation will be in such direction as to cause the cream adjacent to it in the middle of the freezer to be lifted from the bottom to the top. After the cream reaches the top it will pass over to the sides of the can and descend along them. This maintains a constant circulation of the cream while being frozen, prevents stagnation and "buttering" around the shaft and at the bottom of the freezer, and results in the production of "smooth" and uniform cream.

What I claim as my invention is as follows:

1. An ice-cream dasher comprising a vertical spindle with a spiral incline thereon, substantially as shown and described, and for the purpose set forth.

2. An ice-cream dasher comprising a spindle with a spiral incline and radial beaters projecting from such incline, substantially as shown and described.

3. An ice-cream dasher having beaters B B, which, at their junction or union with the spindle from which they spring or project, are spread or webbed, forming a spiral incline around said spindle, substantially as shown and described.

4. Sections consisting of a hub, part of a spiral incline, and a radial arm adapted and designed, when connected, to form an ice-cream dasher, substantially as shown and described.

5. The combination, with the sections, each consisting of a tubular hub, incline, and arm, of the rod or pipe E, forming an ice-cream dasher with a spiral incline and beaters, substantially as shown and described.

In testimony that I claim the foregoing I have hereunto set my hand this 9th day of December, 1882.

THOMAS MILLS.

Witnesses:
 JOS. B. CONNOLLY,
 ANDREW ZANE, Jr.